United States Patent [19]

Holland et al.

[11] Patent Number: 6,146,563
[45] Date of Patent: Nov. 14, 2000

[54] METHOD FOR MANUFACTURING PACKAGING ITEMS OR PARTS THEREOF

[75] Inventors: Geoff Holland, Deerfield, Ill.; Olivier Charriere, Bulle, Switzerland

[73] Assignee: Tetra Laval Holdings & Finance, Pully, Switzerland

[21] Appl. No.: 09/029,443

[22] PCT Filed: Aug. 22, 1996

[86] PCT No.: PCT/IB96/00826

§ 371 Date: Oct. 5, 1998

§ 102(e) Date: Oct. 5, 1998

[87] PCT Pub. No.: WO97/09165

PCT Pub. Date: Mar. 13, 1997

[30] Foreign Application Priority Data

Sep. 6, 1995 [CH] Switzerland .............. 2531/95

[51] Int. Cl.⁷ .............. B29C 44/06; B29C 51/02
[52] U.S. Cl. .......... 264/46.4; 264/153; 264/251; 264/320
[58] Field of Search .................. 264/320, 513, 264/153, 251, 46.4

[56] References Cited

U.S. PATENT DOCUMENTS

| | | | |
|---|---|---|---|
| 3,717,544 | 2/1973 | Valyi | 264/513 |
| 3,939,239 | 2/1976 | Valyi | 264/513 |
| 4,327,052 | 4/1982 | Sauer | 264/512 |
| 4,797,244 | 1/1989 | Sauer | 264/513 |
| 5,049,060 | 9/1991 | O'Leary | 264/320 |
| 5,647,495 | 7/1997 | Orimoto et al. | 264/513 |

FOREIGN PATENT DOCUMENTS

| | | |
|---|---|---|
| 0412493A2 | 2/1991 | European Pat. Off. . |
| 0412493A3 | 2/1991 | European Pat. Off. . |
| 0533437A2 | 3/1993 | European Pat. Off. . |
| 3002890A1 | 7/1981 | Germany . |
| 4358822 | 12/1992 | Japan . |
| 5253965 | 10/1993 | Japan . |
| 2070504A | 9/1981 | United Kingdom . |
| WO 85/01472 | 4/1985 | WIPO .................. 264/513 |

*Primary Examiner*—Allan R. Kuhns
*Attorney, Agent, or Firm*—Oppedahl & Larson LLP

[57] ABSTRACT

The inventive method relates to manufacturing of thermoformed packaging items or parts thereof having a non-uniform wall thickness and containing at least one layer with a specific function which at least one layer needs for this function a specific minimum thickness. In a first method step a multilayer film material (10) containing the layer with the specific function is produced, e.g. by coextrusion. In a second method step a thermoformable blank (30) is produced by injection molding onto the multilayer film material (10) a substantially flat injection molded part (21) with thicker and thinner portions. In a third method step the blank (30) is thermoformed into the packaging item or part thereof or into an item (40) from which the packaging item (50) is produced in further steps. Preferably the multilayer film (10) is a quasi endless band and is fed as such through an injection molding apparatus whereby a quasi endless band (20) of blanks is produced and either the blanks (30) or the thermoformed items (40 or 50) are punched out of the band. One example of an item produceable by the inventive method is the top part of a plastic bottle consisting of a middle cylinder part of the top- and bottom part.

11 Claims, 2 Drawing Sheets

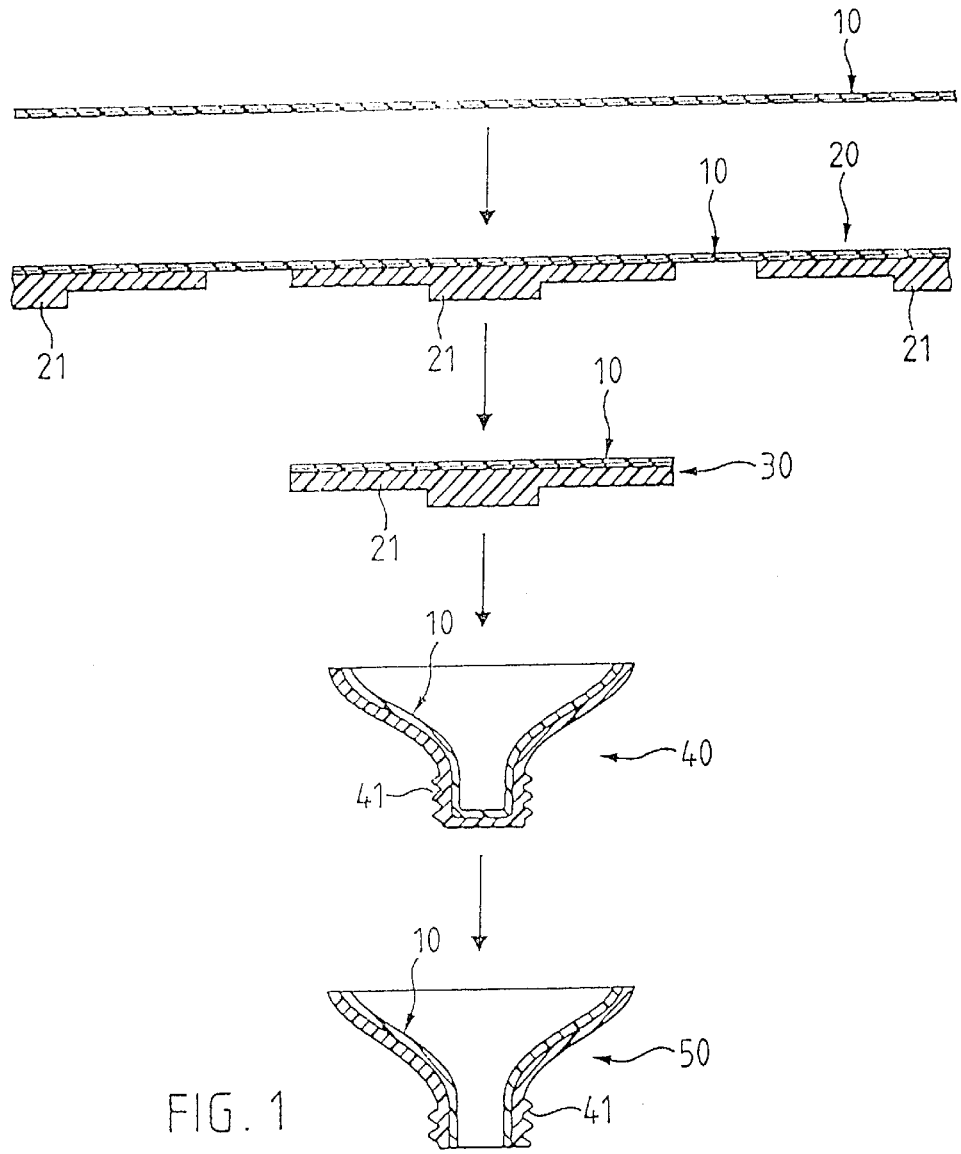
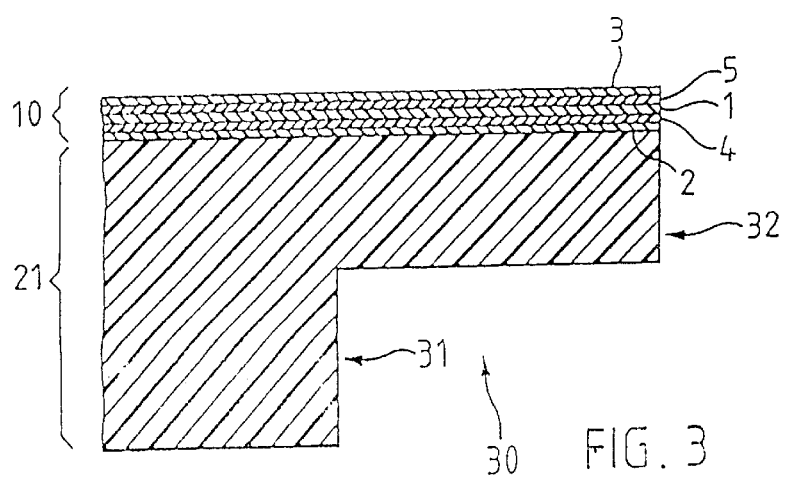
FIG. 1
FIG. 3

METHOD FOR MANUFACTURING PACKAGING ITEMS OR PARTS THEREOF

This application claims priority from PCT application No. PCT/IB96/00826 designating the United States.

The invention is in the field of the packaging industry and relates to a method according to the generic part of the first independent claim, which method serves for manufacturing packaging items of parts thereof by thermoforming corresponding blanks, in particular for manufacturing multilayer packaging items which contain at least one layer serving a specific function, e.g. a barrier layer. The invention further relates to an apparatus for carrying out the method and to packaging items and parts thereof which items or parts are manufactured according to the inventive method.

Many packaging items are manufactured from thermoplastic materials by thermoforming corresponding blanks. If the item is to consist of a plurality of layers serving different purposes, the blanks are usually made from a multi-layer sheet or film material produced e.g. by coextrusion or lamination, which sheet or film material contains all the necessary layers. Such layers are e.g. outer layers of polyethylene or polypropylene giving the item its necessary mechanical strength (bulk-layers) and inner layers serving specific functions (functional layers) such as e.g. barrier functions for improvement of the tightness of the item regarding aroma compounds (aroma barrier layer) regarding gas loss or exchange (gas barrier layer) or regarding light (light barrier layer). Further layers may be adhesive layers for improving the adhesion between outer layers and inner layers and/or surfaces layers serving as sealing layers.

Layers for specific functions such as barrier functions usually consist of more expensive material than the layers giving the item its mechanical strength. Gas barrier layers consist e.g. of ethylene-vinyl alcohol copolymer, which material is not only costly but also represents a foreign body in the packaging item possibly causing recycling problems. For these reasons it is one of the aims of development, to reduce the thickness of such layers, e.g. barrier layers, to the minimum thickness needed for the specific function.

Known methods for manufacturing packaging items including producing a multilayer sheet or film material and thermoforming this material or corresponding blanks punched out of the material, give satisfactory results as long as the thickness of the finished thermoformed item is small and as long as this thickness is more or less homogeneous, i.e. as long as the finished item has a small and substantially uniform wall thickness. If the thickness of the item to be made by thermoforming, differs considerably for varying portions of the item, at least the thicker parts of the packaging item will contain layers whose thickness is not determined by their function only, but much more by the manufacturing method.

In the publication EP-533437 it is proposed to produce thermoformable blanks for multilayer packaging items from a sheet material and add the bulk material by injection moulding it onto the sheet material.

Plastic bottles for water or soft drinks are e.g. made from a middle cylindrical part and bottom and top parts welded to the cylindrical part. The cylindrical part is preferably made from a multilayer sheet material by welding two opposite edges of a flat blank together. Top and bottom parts are made by thermoforming blanks of a similar sheet material. The top part includes a threaded neck portion around a pouring opening on which neck portion, after filling the bottle, a threaded cover is fixed. To give this neck portion sufficient mechanical strength, it needs to have a wall thickness of approximately 1.2 mm. For the reminder of the top part, for the bottom part and the cylinder part, a thickness of approximately 0.6 mm is sufficient.

The top part of such a bottle may serve to illustrate the above discussed problems arising in production of packaging items with areas of different wall thickness and containing at least one layer which, for a specific function needs to have at least a given minimum thickness and which, for mostly economical reasons should not be thicker. For the above described bottle, this layer is a gas barrier layer and is usually made from ethylene-vinyl alcohol copolymer (EVOH). For a satisfactory barrier function such a layer needs a thickness of at least 10 μm. For economical reasons this layer should not be thicker or at least not much thicker than 10 μm.

According to the state of the art an item like the top part of the above described bottle is manufactured by thermoforming

- a flat blank of a multilayer sheet material with a homogeneous thickness of approximately 1.2 mm, which sheet material has been produced by e.g. coextrusion, or
- a flat blank with portions of different thickness (maximum thickness 1.2 mm), which blank has been produced by injection moulding.

As ethylene-vinyl alcohol copolymer is a material which is rather stiff and resisting flow, it is known that for a problem-free coextrusion, the EVOH-layer of a multilayer sheet is to contribute at least 3% of the film thickness. This means that for the 1.2 mm thick sheet material of the blank to be formed into the top part of the bottle, the EVOH layer has a thickness of about 35 μm, which is, in the portions of the finished top part which keep the thickness (neck part), more than three times more than required for the barrier function. To avoid this disadvantage the sheet material for the blank can be made from a thin film containing a gas barrier layer of the given minimum thickness or a somewhat greater thickness by laminating it to a thicker sheet (bulk layer) without barrier layer.

If the item to be made from the sheet has portions of different thickness the sheet needs to be stretched in those portions more than in portions which keep the thickness of the sheet, the same applies to the barrier layer within the sheet. Therefore, according to the original thickness of the barrier layer either the portions with reduced thickness have a too thin barrier layer or the portions with maximum thickness have a too thick barrier layer. A further disadvantage is caused by the waste. In particular for packaging items produced from round blanks which have to be punched out of the sheet, waste amounting to approximately 50% is produced. This disadvantage weighs less heavily, if the blanks are punched by the producer of the sheet material who is able to recycle the waste straight back into the coextrusion.

For producing a flat blank by injection moulding, the material for the barrier layer (e.g. EVOH) needs to be co-injected between the other materials (bulk materials) as a layer covering the whole area of the blank. For achieving this without a high risk of gaps in the EVOH-layer, this layer must have a thickness of about 25 μm, which again at least for the portions of the top part having the same thickness as the corresponding portion of the blank, is 2.5 times more than needed for the barrier function. Furthermore there will be little or no adhesion between the EVOH-layer and the bulk material unless a very expensive material is used for the bulk. Better adhesion could be achieved by using a quintuple injection sequence for introducing an adhesive layer between EVOH and bulk. Such a process is technically very difficult and no adequate results are known. However, lack of adhesion between the EVOH and the bulk material provides for a bypass route for gasses. Furthermore, even if the material is perfectly layered lack of adhesion may cause the EVOH to separate from the other layers where it is exposed at the edges and therefore the final thermoformed part may fail by separation.

The advantage of the injection method compared with the first named one, is the fact that less waste is produced or needs to be recycled.

It is now the object of the invention to show a method for manufacturing multilayer packaging items, in particular packaging items with at least one layer serving a specific function and for being able to do so necessitating a given minimum thickness. The inventive manufacturing method is to include a thermoforming step. The inventive method is to make it possible to a considerably higher degree than known such methods, to keep the named functional layer or layers to the given minimum thickness regardless of the overall wall thickness of the finished part or areas thereof.

This object is achieved by the method as defined by the claims.

The basic idea of the inventive method is to produce a thermoformable blank in the following two steps; firstly a film material is produced which film material contains the at least one specific layer with the given minimum thickness or with a slightly increased thickness; secondly this film material is positioned in a mould for injection moulding into which mould further thermoplastic material is injected to form together with the film material a substantially flat blank. This blank is then, in a third method step thermoformed into the finished part e.g. the top part of the bottle described above, or into an item which is made into a packaging item or part thereof in further steps.

As will be shown furtheron, it is not only possible to achieve the above named object when using the inventive method but also a plurality of further advantages, such making the inventive method not only suitable for producing items which cannot or are at least extremely difficult to be produced with the methods according to the state of the art, but also for producing items without this handicap.

BRIEF DESCRIPTION OF THE DRAWINGS

The inventive method and packaging items produced according to the inventive method are described in connection with the following Figures. Thereby:

FIG. 1 shows the products produced in consecutive steps when manufacturing items such as e.g. top parts for plastic bottles according to the inventive method;

FIG. 3 shows on a larger scale a cross section of an exemplified thermoformable blank for a top part of a bottle.

DETAILED DESCRIPTION OF THE INVENTION

Figure 2:
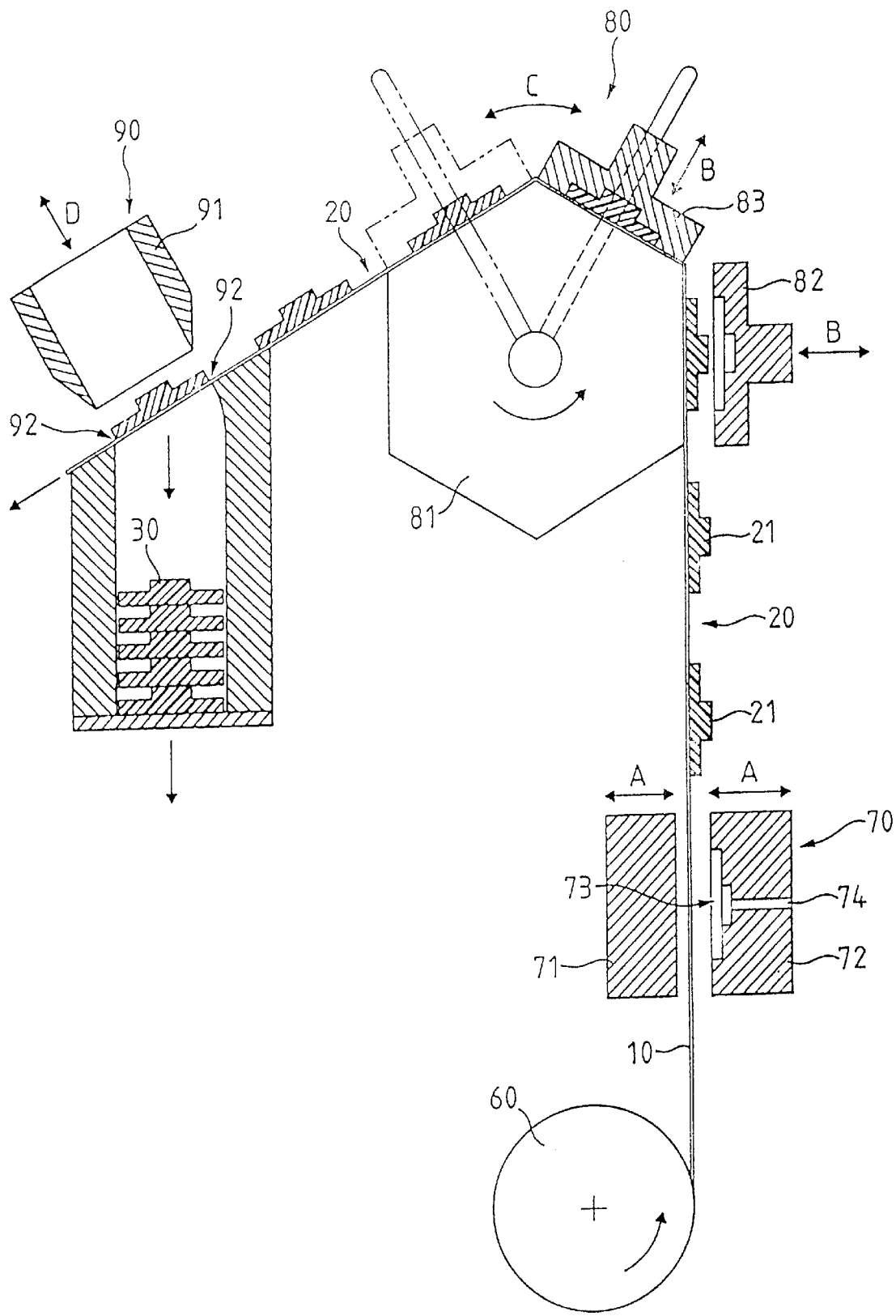
FIG. 2 shows in a very schematic manner an apparatus for the injection moulding step of the inventive method.

FIG. 1 shows underneath each other the intermediate products produced in successive steps of the inventive method as well as the finished product resulting from this method when applied as an example to manufacturing top parts for bottles as mentioned before.

The product of the first method step is a quasi endless film material 10 produced e.g. by coextrusion. Conditions for the film material are as follows:

it contains the at least one layer with specific function, which layer has the necessary minimum thickness given by its specific function or it has a thickness which is greater than the minimum thickness by an amount which corresponds substantially to the area increase ratio of the thermoforming step;

it is mechanically strong enough for being able to be used as a transport means in the injection moulding step;

it is thermostable enough for passing through the injection moulding step without permanent alteration;

it contains at least one surface layer which is able to adhere firmly to the material to be injected in the injection moulding step, e.g. it consists of a polymer based on the same monomer as the thermoplastic material to be moulded onto the film material;

it is as thin as possible for keeping waste to a minimum.

The product of the second method step (injection moulding) is a quasi endless band 20 of the film material 10 to which adhere with regular spacings at least on its one side injection moulded, substantially flat pairs 21, which show portions of varying thickness. The shown injection moulded parts 21 are circular and have a thicker central portion and thinner outer or circumferential portions whereby the thicker central portion is to be formed into the thicker neck portion of the bottle top and the thinner circumferential portion is to be formed into the thinner shoulder portion of the bottle top. It is possible also to inject thermoplastic material on both sides of the film material.

After injection moulding, blanks 30 may be punched out of the quasi endless band 20. The blanks 30 consist of the injection moulded part 21 which is on one surface covered by the film material 10 or of two moulded parts adhering to the film material on both sides. In each case the film material extends over the full area of the blank.

Punching the blanks out of the film after injection moulding is in particular advantageous if the material needs to be shipped at some stage. It is more advantageous to ship the punched out substantially flat blanks rather than the film material with the moulded parts or the finished thermoformed items because firstly the waste of film material stays in the place where it can be recycled easily and secondly the flat blanks use up less shipping space than would the rather bulky finished items.

For the blank 30 shown in FIG. 1 the punched out film material 10 and the injection moulded part 21 have substantially the same size. This is not a condition. Blanks 30 may carry around the injection moulded part 21 a rim of film material, which rim might be used as a welding flap when connecting the finished item to some other item.

The product of the third method step (thermoforming) is the thermoformed item 40 carrying the film 10 advantageously on its concave surface. If, as shown the thermoformed item is a top part for a bottle, it has a threaded neck portion 41 formed of the thicker central part of the blank. The pouring opening is still closed.

Following thermoforming, further steps may follow for finishing the thermoformed item 40, e.g. trimming for producing from the thermoformed item 40 the finished top part 50 for a bottle with a pouring opening.

Comparing the waste produced with the inventive method as illustrated in FIG. 1 with the waste produced when punching blanks from a thick sheet material shows that the area of waste remains the same but its thickness is considerably lower.

Variants of the above described method with the consecutive steps of coextrusion, injection moulding, punching, thermoforming and trimming are the following:

The punching step is carried out only after thermoforming, i.e. the quasi endless band with the adhering injection moulded parts is continuously fed into a thermoforming apparatus, the thermoformed items produced therein still being connected to form a quasi endless band. The thermoformed items are punched from the film material after thermoforming or even after further steps (e.g. trimming, filling, sealing and so on). Such a method variant is advantageous if at least the steps of injection moulding, thermoforming and punching are carried out in the same localities, such that the waste film material can be recycled into the injection moulding step.

There is no trimming step, i.e. the blank and the finished item are such that the finished item can be produced from the blank by thermoforming only. For manufacturing top parts for bottles, this means that the blank must have a hole in its middle. This hole must be spared in the injection moulding step and it must be punched out of the film material either before or after injection moulding.

The film material carries over its width not one but a plurality of similar or different injection moulded parts.

FIG. 2 shows in a schematic manner an apparatus for carrying out the inventive method, in particular the injection moulding step and the punching step for producing from a quasi endless film material 10 the substantially flat blanks 30.

The film material 10 is fed, from a supply roll 60, into an apparatus 70 for injection moulding. The apparatus 70 for injection moulding consists substantially of a first and a second mould part 71 and 72 which mould parts are movable against each other (double arrows A) for closing and opening a mould cavity 73 between the two mould parts. The mould cavity 73 is formed into the second mould part 72 which carries the injection nozzle 74 whilst the first mould part 71 shows a flat surface facing the second mould part. The film material is positioned against this flat surface, when the mould parts 71 and 72 are in their closed position and when thermoplastic polymer material is injected into the cavity.

The film material 20 removed from the apparatus 70 for injection moulding carries on its one surface injection moulded parts 21 with regular spacings. It is guided in a straight line to a conveying means 80 featuring a driven roller 81 with a regular polygonal cross section (e.g. hexagonal) of which cross section the length of the linear parts corresponds to the regular spacing of the injection moulded parts on film 20. The distance between injection moulding apparatus 70 and roller 81 corresponds to a multiple of this spacing (in the Figure twice the spacing).

Cooperating with roller 81 are two clamping means 82 and 83 which are movable against and away from the roller 81 (double arrows B) i.e. positionable in a clamping position against the roller and in a position of rest at a distance from roller 81. Apart from this movement, one of the clamping means 82 is stationary, the other one is further rotatable together with the rotation of roller 81 when in clamping position and in opposite direction when in rest position (double arrow C).

From the conveying means 80 the quasi endless band 20 consisting of the film material 10 and the injection moulded parts 21 adhering thereto is guided to a punching means 90, featuring a punching knife 91 with the form of the blank to be punched from the endless band 20 and movable against and away from (double arrow D) an edge 92 having the same form as the punching knife 91 and serving as counter knife 92. From the punching means 90 the waste of film material is preferably guided into a shredder and the shredded material recycled e.g. into the injection moulding apparatus 70.

The operation of the apparatus according to FIG. 2 is as follows. The film material is conveyed from the supply roll 60 through the injection moulding apparatus 70 by conveying means 80 in a clocked manner. One time interval encompasses the following actions: injecting material into the mould cavity 73, cooling the injected material sufficiently, opening the mould (arrows A), moving the second clamping means 83 into clamping position (arrow B), moving the first clamping means into rest position (arrow B), rotating roller 81 together with the second clamping means 82 by an angle of 60° such removing the moulded part 21 from the mould cavity 73 and positioning a next part of film between the moulds, closing the mould (arrows A), moving the first clamping means 82 into clamping position (arrow B), moving the second clamping means 83 into rest position (arrow B), rotating the second clamping means back by 60° (arrow C).

Care has to be taken that the film material is at least lightly tensioned between the supply roll 60 and the conveying means 80. Only when under tension, the film material 10 is automatically positioned exactly on the surface of mould part 71 and only when under tension the film material 10 can prevent warping of the moulded parts 21 when being moved from the mold. Because of this warping prevention by the film material, the cycle time of the described injection moulding process can be considerably lower, compared with an ordinary injection moulding process in which the moulded part is ejected from the mould by some ejection means integrated in the mould. This reduction in cycle time results from the stabilizing effect of the film material on the moulded part which allows moving the moulded part from the mould when it is still fairly warm and not yet stable by itself and therefore, without corresponding stabilizing means prone to warping.

A further conveying means (not indicated in the Figure) conveys the film material from roller 81 through punching means 90 in the same clocked manner. In each time interval punching knife 91 is moved towards and away from edge 92 for one punching action (double arrow D). The punched out blanks 30 are collected underneath.

FIG. 3 shows on a larger scale a cross section through part of an exemplified thermoformable blank 30 for producing a top part for a plastic bottle as discussed earlier on. The blank has a central thicker portion 31 and a circumferential thinner portion 32.

The blank consists of a film part 10 covering its one surface and of an injection moulded part 21.

The injection moulded part 21 consists of a thermoformable material belonging e.g. to one of the following four groups:

(1) a polyolefine homopolymer or copolymer, a mixture of polyolefine homopolymers, a mixture of a polyolefine copolymer with a homopolymer or a mixture of a polyolefine copolymers, (2) a polyester exemplified by poly(ethylene-terephthalat) or a polyester copolymer, or a mixture of polyester homo- or copolymers, (3) polyvinyl chloride, vinyl copolymers or mixtures of these, (4) polyamides, copolyamides or mixtures of these.

In fact, the injection moulded part may consist of any thermoplastic material which exists in the different forms necessary for both film extrusion and for injection moulding and for which these different forms are sufficiently compatible with one another to form a fusion bond under the conditions of the injection moulding step. In any of these cases the injection moulded part may be solid or formed.

The film part 10 is a film material with typically five layers:

- a middle barrier layer 1 of ethylene-vinyl alcohol copolymer with a thickness of 10 μm,
- a bonding surface layer 2 of a first polyolefine compatible with the material of the injection moulded part (or an other thermoplastic material being able to form a fusion with the material of the injection moulded part) and forming the one surface of the film which is in contact with the injection moulded part 21 and having a thickness of 5 to 15 μm,
- a sealing layer 3 of the first polyolefine or a second polyolefine (or other thermoplastic material) and forming the other surface of the film and having a thickness of 10 to 50 μm,
- a first adhesive layer 4 between the barrier layer 1 and the bonding layer 2 with a thickness of 3 to 5 μm and consisting of an adhesive for adhesively joining EVOH and the first polyolefine, e.g. a grafted polyolefine copolymer chosen for compatibility with the first polyolefine, and
- a second adhesive layer 5 between the barrier layer 1 and the sealing layer 3 with a thickness of 3 to 5 μm and consisting of an adhesive for adhesively joining EVOH and the polyolefine forming the other surface of the film, e.g. a grafted polyolefine copolymer chosen for compatibility with the polyolefine of this second surface of the film.

The film part 10 of blank 30 therefore has a thickness of 31 to 75 μm. The moulded part 21 has a thickness of ca. 0.55 mm in its thinner portions and a thickness of ca. 1.15 mm in its thicker portions.

Films of more or less than five layers might be required for specific applications. For example, if the functional layer consists of an amorphous polyester copolymer typified by Dupont'Selar PT (registered Trade Mark) and the bulk is poly(ethylene-terephthalat) only three layers might be necessary. In other cases, where two functional layers or two layers of the same functional material might be desirable, six or seven layers might be required. Such material can be extruded commercially.

The film is positioned into the mould with the sealing layer towards the flat mould part and the bonding layer towards the cavity and the injection nozzle. It can be shown that the film as described above forms a stable joint with the injected foam or compact material and that it is strong enough for keeping the moulded part from warping when removed from the mould in a still warm configuration.

For increasing the thickness of the barrier 1 it can be advantageous to use two films instead of fabricating a film with a thicker barrier layer. During the injection moulding process, not only the injection moulded part is joined firmly to the film but also two film layers with a thickness of 30 to 70 μm are firmly joined together. For a method variant with double film the two films are positioned such that the two sealing layers are facing each other, or the film material used has instead of a sealing layer a second bonding layer.

What is claimed is:

1. A method for producing multilayer packaging items (50) or parts thereof which items or parts comprise a thermoplastic bulk layer and a functional layer, wherein the thermoplastic bulk layer consists of a thermoplastic polymer bulk material and has for mechanical reasons areas of higher thickness and areas of lower thickness and wherein the functional layer consists of a functional material and for being effectively functional requires a given minimum thickness, the method comprising the steps of:
   producing a multilayer film material (10) containing the functional material in a layer of a uniform thickness,
   providing a mold,
   positioning the film material in the mold,
   injecting the thermoplastic polymer bulk material into the mold to form a blank (30) consisting of a film part (10) of a uniform thickness joined to an injection molded part (21) with areas of lower thickness and areas of higher thickness located such that they anticipate areas of lower wall thickness and areas of higher wall thickness of the item or part, and
   thermoforming the blank,
   wherein for joining the film part and the thermoplastic polymer bulk part in the step of injecting, the film material comprises a surface layer (2) of a material able to form a fusion bond with the thermoplastic polymer bulk material, and
   wherein in the step of thermoforming, the item or part is made from the blank; wherein the thickness ratio for the higher to lower thickness areas of the multilayer packaging items or parts thereof is substantially similar to the thickness ratio of corresponding higher and lower thickness areas of the blank.

2. Method according to claim 1, wherein the surface layer is a polymer based on the monomer which is the main monomer of the thermoplastic polymer bulk material.

3. Method according to claim 1 wherein the film material (10) is produced by coextrusion and has the form of a quasi endless band.

4. Method according to claim 3, wherein the quasi endless band is fed in a clocked manner through a mould cavity (73), into mould cavity (73) the thermoplastic polymer bulk material is injected in the same clocked manner such that moulded parts (21) are moulded onto the quasi endless band of film material (10) in regular spacings and are removed from the cavity (73) by the band of film material (10).

5. Method according to claim 4, wherein the film material (10) is positioned with one surface against a flat wall part of the mould cavity (73) and that the thermoplastic polymer bulk material is injected towards the other surface of the film material (10), which other surface of the film material carries the surface layer able to form a fusion bond with the bulk material (2).

6. Method according to claim 4 wherein the quasi endless band of film material (10) is kept under tension when fed through the mould cavity (73).

7. Method according to claim 3, wherein after injection moulding and sufficient cooling, blanks (30) consisting each of an injection moulded part (21) joined to film material (10) are punched out.

8. Method according to claim 3, wherein a quasi endless band (20) consisting of film material (10) and injection moulded parts (21) joined to it in regular spacings, is fed into a thermoforming apparatus and in that the thermoformed packaging items (40) are punched out of the quasi endless band.

9. Method according to claim 1, wherein in the step of positioning the film material in the mould, two superimposed films (10) with touching surface layers are positioned into the mould, wherein the touching surface layers of the two films consist substantially of the same material.

10. Method according to claim 1, wherein the functional layer is a gas barrier layer (1) consisting of ethylene-vinyl alcohol copolymer and that the multilayer film (10) material contains this layer with a thickness of 10 μm.

11. Method according to claim 1 wherein the injection moulded part (21) consists of a foamed or a solid thermoplastic material.

* * * * *